(12) United States Patent
Kumar

(10) Patent No.: US 12,219,183 B2
(45) Date of Patent: Feb. 4, 2025

(54) QUICKER STARTUP

(71) Applicant: DISH Network Technologies India Private Limited, Karnataka (IN)

(72) Inventor: Krishna Arun Kumar, Karnataka (IN)

(73) Assignee: DISH Network Technologies India Private Limited, Bengaluru (IN)

(*) Notice: Subject to any disclaimer, the term of this patent is extended or adjusted under 35 U.S.C. 154(b) by 109 days.

(21) Appl. No.: 18/148,299

(22) Filed: Dec. 29, 2022

(65) Prior Publication Data

US 2024/0223820 A1 Jul. 4, 2024

(51) Int. Cl.
| | |
|---|---|
| *H04N 21/2183* | (2011.01) |
| *H04N 5/45* | (2011.01) |
| *H04N 21/443* | (2011.01) |
| *H04N 21/475* | (2011.01) |

(52) U.S. Cl.
CPC .......... *H04N 21/2183* (2013.01); *H04N 5/45* (2013.01); *H04N 21/4435* (2013.01); *H04N 21/4753* (2013.01)

(58) Field of Classification Search
CPC .. H04N 21/2183; H04N 5/45; H04N 21/4435; H04N 21/4753
See application file for complete search history.

(56) References Cited

U.S. PATENT DOCUMENTS

| | | | |
|---|---|---|---|
| 2013/0318211 A1* | 11/2013 | Kent | ................... H04L 67/01 709/219 |
| 2016/0210998 A1* | 7/2016 | Leske | ................ G11B 27/031 |
| 2019/0057195 A1 | 2/2019 | Watson et al. | |
| 2020/0084250 A1 | 3/2020 | Sehgal | |
| 2022/0060765 A1* | 2/2022 | Pfeifer | ............. H04N 21/2393 |
| 2022/0286724 A1* | 9/2022 | Whittaker | .......... G06F 21/1083 |

FOREIGN PATENT DOCUMENTS

| | | |
|---|---|---|
| CN | 102 984 574 A | 3/2013 |
| WO | 2016/118384 A1 | 7/2016 |

* cited by examiner

*Primary Examiner* — Jefferey F Harold
*Assistant Examiner* — Franklin S Andramuno
(74) *Attorney, Agent, or Firm* — Kilpatrick Townsend & Stockton LLP

(57) ABSTRACT

A computer-implemented method is provided. The method includes launching a streaming media interface application in response to a user input, performing a first memory check to determine presence or absence of first cached data, locating first cached data that includes content of a home page of the user's account, retrieving and processing the first cached data to display the content included therein, concurrently with displaying the content included in the first cached data, performing a process for user authentication, and performing the process for user authentication is delayed until after initiating displaying the content included in the first cached data, sending a user request for content of a video stream selected by the user, receiving the content of the user-selected video stream in response to a determination that the user is authenticated, and initiating a first streaming session to play the content of the user-selected video stream.

20 Claims, 8 Drawing Sheets

QUICKER STARTUP

BACKGROUND OF THE DISCLOSURE

The present disclosure generally relates to systems, methods, and program products for video streaming, and more particularly techniques for quick startup of a video stream.

Media streaming is an increasingly popular way of delivering television, movies, and other media content to users. Media streaming devices typically provide a user interface in which a list or other graphical ordering of available media content are presented to the user. The user may then browse through this list and select a desired video stream using a remote-control device, a mouse, or any other form of input device. The user might also perform a search based on keyword, media content type, media source, or the like. However, the media contents are usually provided by a content source, which grants the media streaming device the access to the user-selected media content only after the user is authenticated. Conventionally, when the user interface is launched on a media streaming device, a user authentication process is automatically initiated. The user may not begin viewing any content of the selected video stream until after the user authentication is completed. Because the user authentication process may take a considerably long time, it may cause an unfavorably long wait time for the user and undermine the user satisfaction.

BRIEF SUMMARY OF THE DISCLOSURE

In accordance with some embodiments of the present disclosure, a computer-implemented method is provided. In one example, the method includes: launching a streaming media interface application executed on the client media device in response to a user input of a user; performing a first check on a memory of the client media device to determine presence or absence of first cached data, the first cached data including content of a home page of a user's account associated with a content source and at least one title page with respect to at least one video stream provided by the content source; retrieving the first cached data from the memory and processing the first cached data to initiate displaying the content included in the first cached data on a display device in communication with the client media device; concurrently with displaying the content included in the first cached data, performing a process for user authentication, and performing the process for user authentication is delayed until after initiating displaying the content included in the first cached data; sending a user request for content of a video stream selected by the user to a streaming media server in communication with the content source; receiving the content of the user-selected video stream from the streaming media server when an outcome of the process for user authentication indicates that the user is authenticated; and initiating a first streaming session to play the content of the user-selected video stream on the client media device. In some embodiments, performing the process for user authentication further includes: initiating the process after initiating displaying the content included in the first cached data; sending an authentication request including user information to an authentication server in connection with the content source to allow the authentication server to authenticate the user; and performing the process in a background layer of the streaming media interface application while displaying the content included in the first cached data.

In accordance with some embodiments of the present disclosure, a system is provided. In one example, the system includes a client media device, a streaming media server, an authentication server, and a communications network. The client media device includes one or more electronic processors, a machine-readable storage medium in electronic communication with the one or more electronic processors, instructions stored in the machine-readable storage medium and executable by the one or more electronic processors to cause the system to: launch a streaming media interface application executed on the client media device in response to a user input of a user; perform a first check on a memory of the client media device to determine presence or absence of first cached data; locate the first cached data in the memory, the first cached data including content of a home page of a user's account associated with a content source and at least one title page with respect to at least one video stream provided by the content source; retrieve the first cached data from the memory and process the first cached data to display the content included in the first cached data on a display device in communication with the client media device; perform a process for user authentication concurrently with displaying the content included in the first cached data, performing the process for user authentication being delayed until after initiating displaying the content included in the first cached data; send a user request for content of a video stream selected by the user to a streaming media server in communication with the content source; receive the content of the user-selected video stream from the streaming media server when an outcome of the process for user authentication indicates that the user is authenticated; and initiate a first streaming session to play the content of the user-selected video stream on the client media device.

In accordance with some embodiments, the present disclosure provides a non-transitory machine-readable storage medium encoded with instructions, the instructions executable to cause one or more electronic processors of a client media device platform operations of a method. The method includes: launching a streaming media interface application executed on the client media device in response to a user input of a user; performing a first check on a memory of the client media device to determine presence or absence of first cached data, the first cached data including content of a home page of a user's account associated with a content source and at least one title page with respect to at least one video stream provided by the content source; retrieving the first cached data from the memory and processing the first cached data to initiate displaying the content included in the first cached data on a display device in communication with the client media device; concurrently with displaying the content included in the first cached data, performing a process for user authentication, and performing the process for user authentication is delayed until after initiating displaying the content included in the first cached data; sending a user request for content of a video stream selected by the user to a streaming media server in communication with the content source; receiving the content of the user-selected video stream from the streaming media server when an outcome of the process for user authentication indicates that the user is authenticated; and initiating a first streaming session to play the content of the user-selected video stream on the client media device.

BRIEF DESCRIPTION OF THE DRAWINGS

A further understanding of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE DISCLOSURE

The following Detailed Description is merely exemplary in nature and is not intended to limit the scope of the present disclosure or the application and uses of the teachings of the present disclosure.

In various embodiments, a method is provided to play a video stream on a client media device to a user. One insight provided by the present disclosure is that the method employs delayed user authentication and enables the user to have a quick startup of interaction with the streaming media interface application and/or a quick startup of a video streaming session before the user authentication is completed. The method of the present disclosure can minimize or eliminate the unfavorable waiting period for the user and can significantly enhance the user experience in the startup of a video stream using the client media device.

Figure 1A:
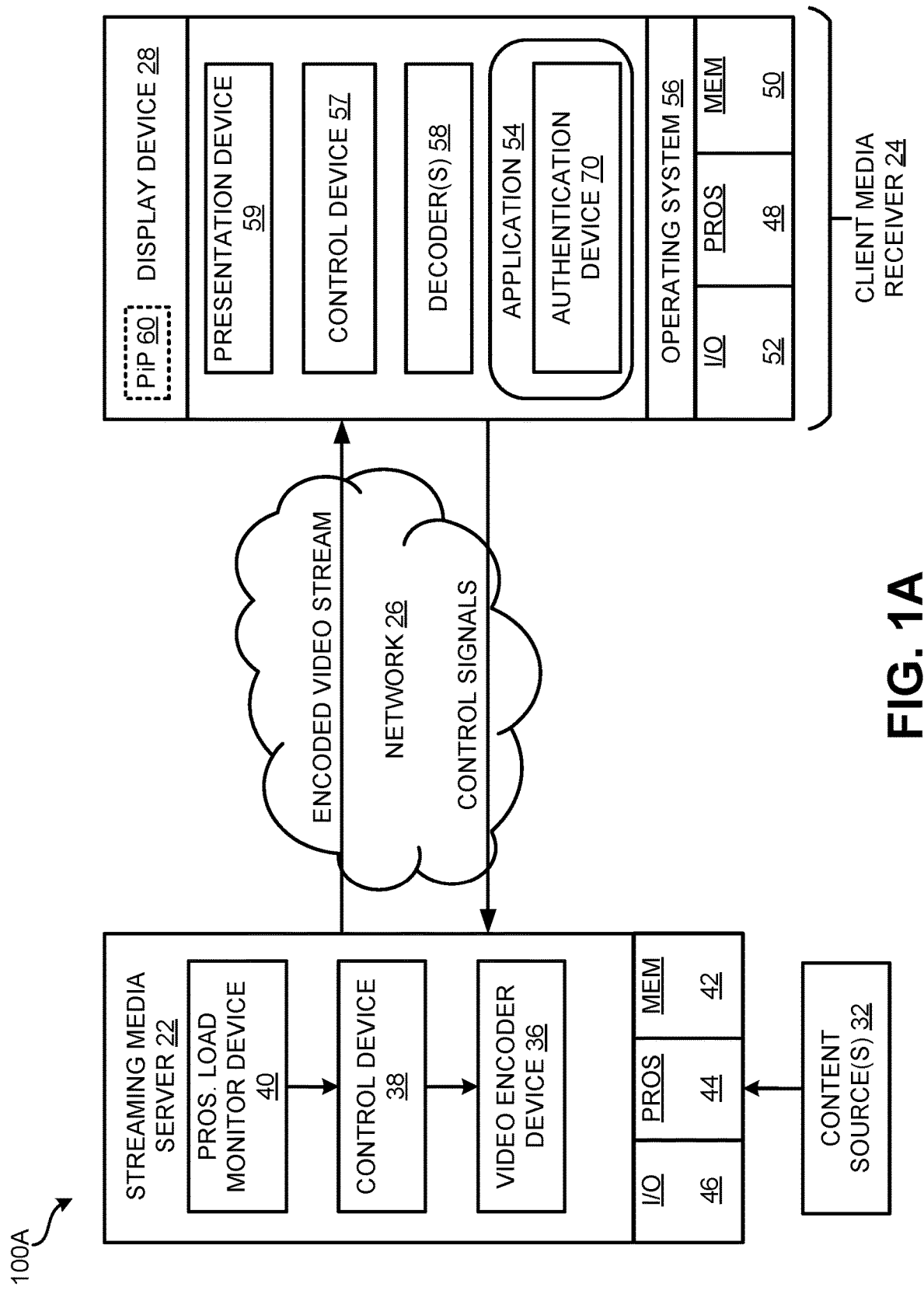
FIG. 1A is a schematic diagram illustrating an example system for playing a video stream in accordance with some embodiments.

FIG. 1A schematically illustrates an example streaming media system 100A. The streaming media system 100A includes a streaming media server 22 and a client media device 24. The streaming media server 22 is suitable for applying adaptive bit rate (ABR) during a streaming video session established between the streaming media server 22 and at least one client media device 24. As depicted in FIG. 1A, streaming media server 22 and, more broadly, streaming media system 100A are provided as generalized examples and should not be construed as limiting in any respect. In addition to streaming media server 22 and client media device 24, streaming media system 100A further includes a communications network 26 over which streaming video sessions are conducted. Communications network 26 may encompass any number of digital or other networks enabling bidirectional signal communication between the streaming media server 22 and client media device 24 utilizing common protocols and signaling schemes. In this regard, communications network 26 can include one or more open content delivery networks (CDNs), Virtual Private Networks (VPNs), Local Area Networks (LANs), Wide Area Networks (WANs), the Internet, and various other communications networks implemented in accordance with TCP/IP protocol architectures, User Datagram Protocol (UPD) architectures, or other communication protocols. In embodiments, communications network 26 may also encompass a cellular network and/or any other public or private networks.

During a given streaming video session, the streaming media server 22 encodes, packetizes, and transmits streaming video content over communications network 26 to client media device 24. The streaming video content will typically, but need not necessarily include accompanying audio content. As the content is received, client media device 24 decrypts (if needed) and decodes the streaming video content (also referred to as a "video stream," a "video-containing media stream", or a "media stream" herein). Client media device 24 utilizes the newly-decoded content to generate corresponding video output signals, which are supplied to display device 28 for viewing by the client media device 24. The video output signals may be transmitted within a single electronic device or system when client media device 24 and display device 28 are combined as a unitary device, such as a smartphone, laptop computer, tablet computer, wearable device, or smart television (that is, a television containing an integrated media receiver). In embodiments in which display device 28 is realized as an independent electronic device separate and apart from client media device 24, such as a freestanding television set or monitor, client media device 24 may output the video output signals as wired or wireless transmission, which is then forwarded to display device 28.

In some embodiments, streaming media server 22 may encode, packetize, and transmit a single video stream during the streaming video session. In other instances, and as indicated in FIG. 1A, streaming media server 22 may concurrently transmit multiple video-containing media streams as, for example, a streaming channel bundle provided pursuant to an Over-the-Top (OTT) television service. In still other instances, streaming media server 22 may concurrently provide separate video streams to multiple client media devices 24; e.g., as may occur when the streaming media server 22 assumes the form of a consumer placeshifting device, which provides streaming content to multiple client devices (e.g., smartphones, tablets, televisions, or the like) located within a user's residence or similar area. Regardless of the number of streaming channels or video streams provided by the streaming media server 22 to client media device 24 during a given streaming video session, the streaming video content can be obtained from any number and type of content sources 32 in communication with or included within streaming media server 22. Content sources 32 can include, for example, content providers and aggregators external to streaming media server 22 and in communication with the streaming media server 22 over communications network 26. In some embodiments, content sources 32 can include any number and type of storage mediums accessible to streaming media server 22 (e.g., contained within or operably coupled to the streaming media server 22) in which the video content subject to streaming is stored.

As appearing herein, the term "streaming media server" is defined broadly to encompass any device or group of operably-interconnected devices may encode video content at an ABR value, which is repeatedly adjusted in response to variations in processor load (and other factors) in the manner described herein. In the illustrated embodiment, specifically, streaming media server 22 includes at least one video encoder device 36, which operates under the command of at least one control device 38. Additionally, streaming media server 22 also includes a processor load monitoring device 40. While generically illustrated as a separate device in FIG. 1A, the processor load monitoring device 40 can be combined with the control device 38 in some embodiments. Devices 36, 38, 40 can be implemented utilizing any combination of hardware and software (including firmware) components. For example, devices 36, 38, 40 may be implemented utilizing software or firmware embodied by code or computer-readable instructions residing within memory 42 and executed by at least one processor 44 (e.g., a CPU) further included in the streaming media server 22. As illustrated, memory 42 generally depicts the various storage areas or mediums (computer-readable storage mediums) contained in streaming media server 22 and may encompass any number and type of discrete memory sectors. In some embodiments, processor 44 may be a microprocessor, which is realized along with other non-illustrated components included in the streaming media server 22 as a system-on-a-chip. Finally, it will be appreciated that streaming media server 22 may contain various other components known in the art including, for example, any number and type of Input/Output (I/O) feature 46 enabling bidirectional communication with client media device 24 and, perhaps, other nodes or devices over the communications network 26.

Client media device 24 can assume various different forms, including, but not limited, to that of a mobile phone, a wearable device, a tablet, a laptop computer, a desktop computer, a gaming console, a digital video recorder (DVR), or a set up box (STB). When engaged in a video streaming session with streaming media server 22, client media device 24 generates video signals for presentation on a display device 28. As indicated above, the display device 28 can be integrated into client media device 24 as a unitary system or electronic device. This may be the case when client media device 24 assumes the form of a mobile phone, tablet, laptop computer, a smart television, or similar electronic device having a dedicated display screen. In some embodiments, the display device 28 can assume the form of an independent device, such as a freestanding monitor or television set, which is connected to client media device 24, such as a gaming console, DVR, STB, or another peripheral device, utilizing a wired or wireless connection. In such embodiments, the video output signals may be formatted in accordance with conventionally known standards, such as S-video, High Definition Multimedia Interface ("HDMI"), Sony/Philips Display Interface Format ("SPDIF"), Digital Video Interface ("DVI"), or Institute of Electrical and Electronics Engineers (IEEE) 1394 standards.

By way of non-limiting illustration, client media device 24 is shown as containing at least one processor 48 configured to selectively execute software instructions, in conjunction with associated memory 50 and I/O features 52. I/O features 52 can include a network interface, an interface to mass storage, an interface to display device 28, and/or various types of user input interfaces. Client media device 24 may execute a software program or the media interface application 54 directing the hardware features of client media device 24 to perform the functions described herein.

Media interface application 54 suitably interfaces with processor 48, memory 50, and I/O features 52 via any conventional operating system 56 to provide such functionalities. The software application can include a placeshifting application in embodiments and streaming media server 22 assumes the form of an STB, DVR, or similar electronic device having placeshifting capabilities and typically located within a user's residence. In some embodiments, client media device 24 may be implemented with special-purpose hardware or software, such as the SLING-CATCHER-brand products available from Sling Media Inc., currently headquartered in Foster City, Calif., and/or any other products.

With continued reference to FIG. 1A, media interface application 54 suitably includes control device 57 adapted to process user input, receive video stream from streaming media server 22, decode the received media streams, and provide corresponding output signals to display device 28 in the above-described manner. Media interface application 54 decodes the content of video stream utilizing at least one decoder 58, which may be implemented as specialized hardware or software executing on processor 48 in some embodiments. The decoded content is supplied to presentation device 59, which generates corresponding output signals transmitted to display device 28. In embodiments, presentation device 59 may also combine decoded programming to create a blended or composite image, for example, one or more picture-in-picture (PIP) images 60 may be superimposed over a primary image generated on display device 28.

The media interface application 54 further includes a user authentication device 70 executable to generate instructions to cause one or more electronic processors of the client media device 24 to initiate and perform a process for user authentication for playing user-selected video streams according to teachings of the present disclosure. In some embodiments, the user authentication device 70 could function to transmit a request for user authentication to the streaming media server 22, the request including user information (e.g., user identity, user account information) for the streaming media server 22 to validate, authorize, and authenticate the user of the user account associated with the content source(3) 32 that provide content of the user-selected video stream to the streaming media server. The user authentication device 70 could coordinate with other functional devices of the client media device 24 to initiate and perform the process for user authentication at specific time or step in a sequence of operations.

Figure 1B:
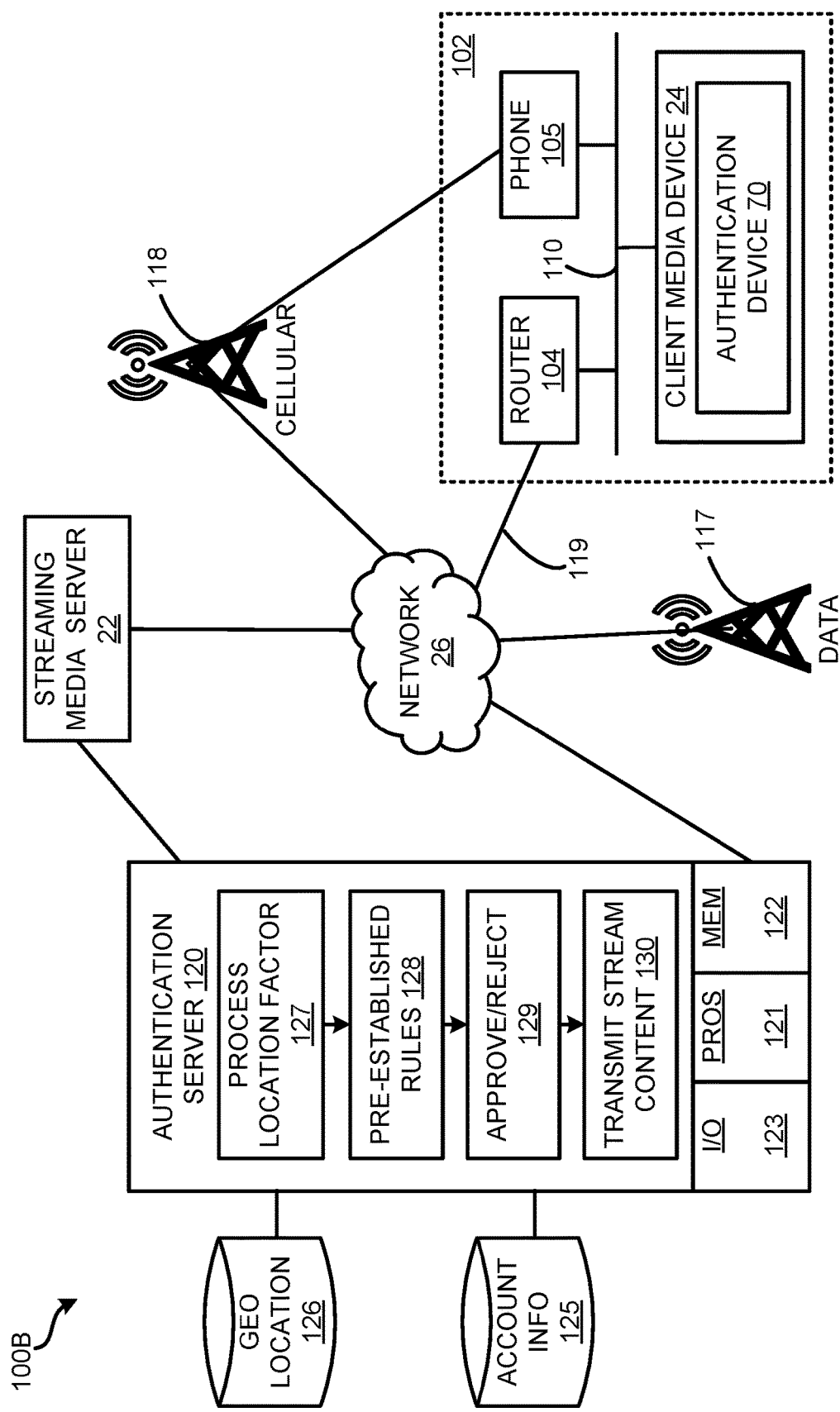
FIG. 1B is a schematic diagram illustrating an example of a user authentication system for playing a video stream in accordance with some embodiments.

FIG. 1B is a schematic diagram illustrating an example of a user authentication system 100B for video streaming according to some embodiments. The system 100B suitably includes, among other components, an authentication server 120, a streaming media server 22 (FIG. 1A), a communications network 26 (FIG. 1A), a home environment 102 including a client media device 24.

The authentication server 120 generally functions to receive requests for media streaming generated by the user authentication device 70 of the client media device 24, perform a process for user authentication to validate user identity and account information, determine the eligibility of the client media device 24 regarding the user request, and authorize/authenticate user and the client media device.

It is noted that the authentication server 120 may be integrated on and implemented by the streaming media server 22. In other words, the authentication server 120 is a functional component of the streaming media server 22, and the client media device directly send user information and request to the streaming media server 22, and the authentication server 120 processes the user information, performs a process for user authentication, and respond to the user request. In some embodiment, the authentication server 120 may be independent from the streaming media server 22, for example, implemented on a separate content provisioning server (e.g., the content source 32 of FIG. 1A or a third-party/independent authorization server).

The authentication server 120 grants or denies access to media streams provided on the communication network 26 based upon one or more factors, as described more fully herein. In some embodiments, access is granted or denied in accordance with pre-established rules 128 that govern media streams provided to some locations. Upon approval, the media stream may be allowed into home environment 102, and the video streams can be played on the client media device 24 within the home environment. Pre-established rules 128 may also limit or restrict media streams that are provided outside of home environment 102.

The authentication server 120 is any sort of server or other computer may communicate on the communications network 26. The authentication server 120 typically includes a conventional processor 121, memory 122 and input/output interfaces 123 to support data processing and the other functions described herein. In a typical embodiment, processor 121 executes a software program that resides memory 122. Equivalent embodiments may execute multiple copies of software program using shared computing hardware, as in a "cloud" server or the like.

The communications network 26 is any sort of communications network that allows delivery of streaming media using a client/server or other communications model. In some embodiments, the communications network 26 is accessible via any number of access points, such as via a cellular or other mobile phone connection 118, a wireless or other network connection 117, and/or the like. The devices in the home environment 102 and authorization server 120, streaming media server 22 may connect to the communications network 26 in any conventional manner using appropriate hardware, software, wired or wireless interfaces, signaling protocols and the like.

In the example illustrated in FIG. 1B, the authentication server 120 includes appropriate devices, routines and/or other processing device 129 to receive user requests for media streams from the client media device 24, to process the location information 127 about the device requesting the media stream, and to apply appropriate pre-established rules 128 in granting or denying access to the stream as appropriate. Location information 127 may relate to the network address of the requesting device, a global positioning system (GPS) or other report of the requesting device's location, the type of device (e.g., stationary or mobile) requesting the stream, or any other information as appropriate. In some embodiments, the authentication server 120 may consult a geo-location database 126 or similar service that is able to identify the geographic location of the requesting device based upon the IP or other network address of the requesting device. The authentication server 120 may also consider an account database 125 to authenticate users based upon userid/password data, biometric data, or any other digital credentials. Account database 125 may be hosted by a separate computing system other than the authentication server 120, as appropriate.

In various embodiments, the approved streaming content is transmitted to the streaming media server 22, which functions as an intermediary and provides the streaming content using any open or proprietary formats. Examples of applications that may make use of the media streaming authorization techniques described herein include IPTV, RSDVRs, video on demand (VOD), placeshifting and/or the like. In a typical embodiment, the authentication server 120 will process stream requests received from the client media device 24 and will then notify the authentication server 120 when streams are approved. Other embodiments may combine some or all of the functions of the authentication server 120 and the client media device 24 as desired.

In the example illustrated in FIG. 1B, the home environment 102 includes the client media device 24 and other mobile or stationary devices logically residing behind a router 104. Router 104 may be any sort of network bridge, router, repeater, gateway or other device that provides access to the communications network 26. A conventional router 104, for example, may provide packet routing, access control, security and other functions associated with communications between a local area network (LAN) no and a wide area network (WAN) such as network 26. Although the home environment 102 illustrated in FIG. 1B includes only a single LAN 110, in practice the home environment 102 may include any number of wired and/or wireless LANs that typically operate within the geographic proximity of a home, office or other structure and that are generally under the control of a single user, family or operator. A single family or entity, for example, typically retains control of the router 104 and other computing hardware operating within home environment 102. The home environment 102, then, can be a good indicator of the client media device 24 and other mobile or stationary devices owned or operated by the same user.

As noted above, the authentication server 120 grants or denies access to media streams based at least in part upon location information 127 of the client media device 24 or other mobile or stationary devices requesting the media stream. Location information 127 may include, for example, the network address of the requesting device, the actual physical location of the requesting device (e.g., whether the physical location is within the home environment 102), the mobile or stationary nature of the device (e.g., derived from device manufacturing information), or any other factors as appropriate. The location of the requesting device may be used in any manner, as defined by pre-established rules 128.

Figure 2:
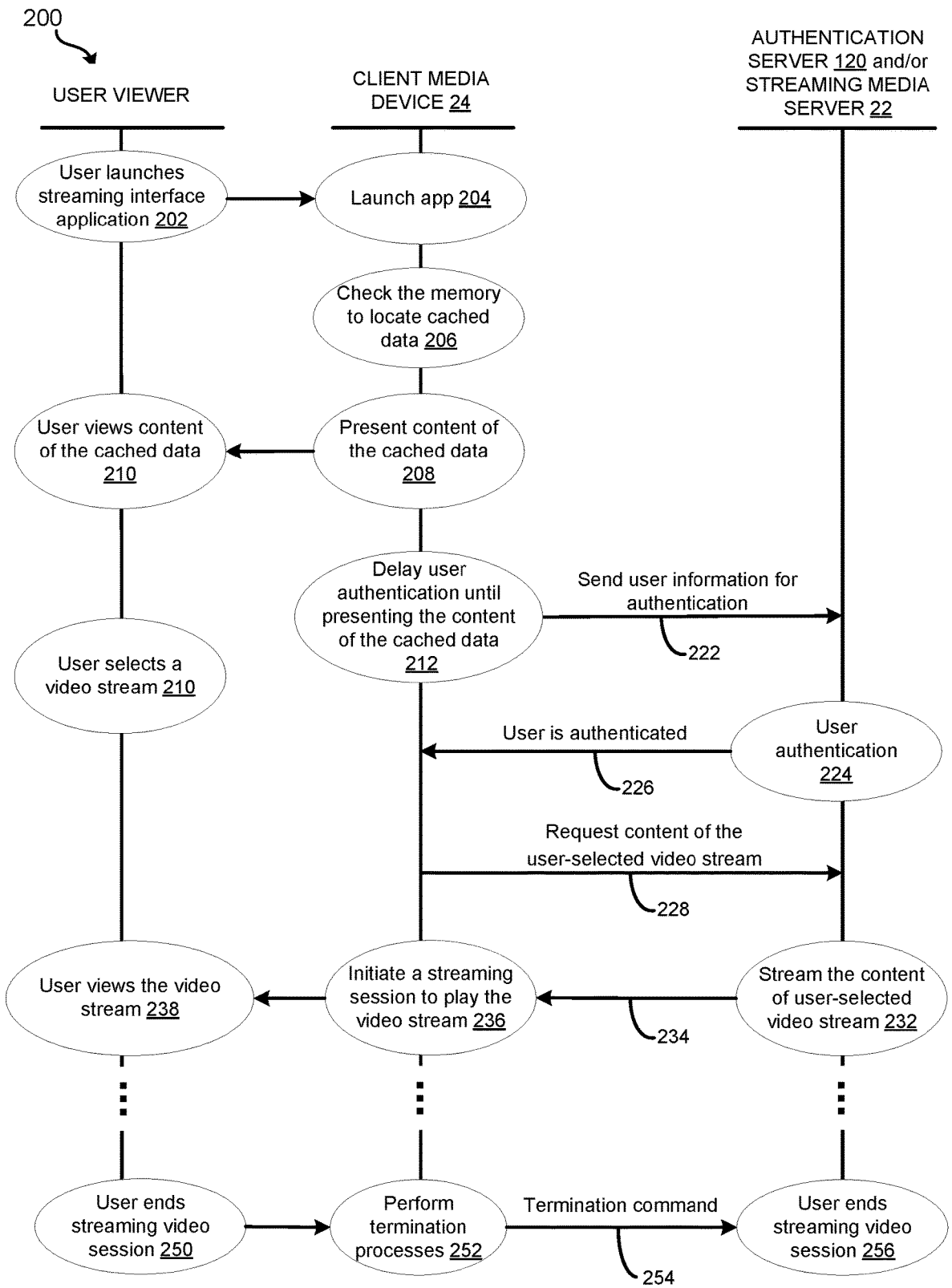
FIG. 2 is a message flow diagram illustrating an exemplary process for playing a video stream on a client media device illustrated in FIG. 1A and FIG. 1B in accordance with some embodiments.

FIG. 2 is a message flow diagram of an example process 200, as illustrated in accordance with some embodiments of the present disclosure. Process 200 commences when client media device 24 recognizes a likely intent on behalf of an end user to initiate a streaming video session in a near or imminent future timeframe. For example, client media device 24 may initiate process 200 in response to the launch of a streaming media interface application 54, such as an OTT streaming application (FUNCTION 202). Streaming media interface application may be launched in response to user request received at client media device 24. Such a user request can be entered by an end user into client media device 24 utilizing a user input interface (e.g., a keyboard, pointer device, touchscreen, scroll wheel, voice command system, remote control, etc.) included within I/O features 52 (FIG. 1A) or otherwise operably coupled to client media device 24. Client media device 24 responds accordingly (FUNCTION 204) by launching the streaming media interface application.

Upon the launch of the streaming media interface application, the client media device 24 is instructed to perform a first memory check (FUNCTION 206) to determine the presence or absence of any cached data that includes content of the user's account associated with a content source. The "cached data" used herein encompasses any data stored in the cache, memory, or local storage of the client media device 24. In some embodiments, the cached data includes content of a main page, a home page, a profile page, a program guide, or other types of graphical user interface. For example, the home page may be a part of a graphical interface presenting one or more title pages respectively corresponding to one or more video streams (e.g., comedy, drama, action, science fiction, horror, music, movie, television channel, or any forms of audiovisual media) provided by the content resource. The home page may also present a link to a preview segment of streaming content and/or a title page for each video stream.

When the presence of the cached data is determined, the client media device 24 is instructed to locate cached data, retrieve, and process the cached data to present the content included in the cached data on a display device in communication with the client media device (FUNCTION 208). The user is allowed to view the contents included in the cached data (FUNCTION 210). For example, the user can browse the home page of the user's account, view the title pages and preview segments of the video streams by clicking the corresponding link. The user may select one or more video streams (FUNCTION 210) and enter a user request for playing the full content of the selected video stream through the streaming media interface application. The user may also create a playlist for multiple video streams and enter a user request for the full content of the selected video streams in the playlist through the streaming media interface application.

In some embodiments, the client media device 24 is instructed to delay initiation of user authentication (TRANSMISSION 212) until after initiating playing the content of the cached data. This allows the user to quickly start interacting with the streaming media interface application, viewing the content of the cached data presented on the client media device, browsing the home page of user accounts, previewing the video streams in advance, selecting the video stream of interest. Because of the quick startup, the user need not wait for user authentication, which may take a significant duration of time (e.g., from a few seconds to minutes). Accordingly, the user experience could be significantly improved.

After initiating the playing of the content of the cached data and concurrently with the playing, the user authentication device 70 instructs the client media device 24 to perform a process for user authentication. In some embodiments, the client media device 24 is instructed to send a request for user authentication (FUNCTION 222) to the authentication server 120. The request for user authentication may include various information about the user (user identity, user account, credentials, etc.), the client media device, the location, the home address, etc.

As mentioned above, the authentication server 120 may be a part of the streaming media server 22 or a third-party server independent from the streaming media server 22. If the authentication server 120 is a part of the streaming media server 22, the user request (e.g., a request for the full content of a user-selected video stream) is sent directly to the streaming media server 22, received, and processed by the authentication server 120. Upon approval (e.g., the user is authenticated), the streaming media server 22 will transmit the full content of the user-selected video stream to the client media device 24. In some embodiments, if the authentication server 120 is a third-party server independent from the streaming media server 22, the user request is received and processed by the authentication server 120. Upon approval, the authentication server 120 instructs the content resource to transmit the full content of the user-selected video stream to the streaming media server 22, which functions as an intermediary and transmits the full content of the user-selected video stream to the client media device 24 in response to an existing or a new user request.

As shown in FIG. 2, upon receipt of the user information (TRANSMISSION 222), the authentication server 120 processes the user information to grant or deny the access to the user-selected video stream and/or determine the eligibility of the client media device for playing the user-selected video stream (FUNCTION 224), as described above with reference to FIG. 1B. When an outcome of the process for user authentication indicates that the user is authenticated and the user access to the user-selected video stream is granted, the authentication server 120 sends a notification (TRANSMISSION 226) to the client media device 24. Upon receipt of the notification, the client media device 24 sends a request for the full content of the user-selected video stream (TRANSMISSION 228) to the streaming media server 22. In response, the streaming media server 22 establishes a connection with the client media device 24 and initiates streaming of the user-selected video stream (FUNCTION 232) and transmit the full content of the user-selected video stream (TRANSMISSION 234) to the client media device 24. The client media device 24 initiates a streaming session to play the video stream (FUNCTION 236) and display the content of the video stream on a display device in communication with the client media device 24 for the user to view (FUNCTION 238).

Finally, when the user ultimately chooses to conclude the current streaming video session (FUNCTION 250), the client media device 24 may engage in the appropriate shutdown or termination process (FUNCTION 252). In embodiments in which the client media device 24 utilizes the last-viewed streaming OTT channel as the sample video, client media device 24 may store the identity of the last-viewed streaming OTT channel in cache or memory. Client media device 24 then transmits a termination command to streaming media server 22 (TRANSMISSION 254), streaming media server 22 then terminates the current streaming session (FUNCTION 256), and process 200 concludes.

It is noted that the process for user authentication may be performed by the user authentication device 70 of the client media device 24 in a background layer of the streaming media interface application while the content of the cached data is being played. As mentioned above, performing the process for user authentication may last for as short as a few seconds to as long as a few minutes. If the user is authenticated before the user selects a video stream (FUNCTION 210), the user can view the full content (FUNCTION 238) without the need to wait for the user authentication process to complete. If the user is not authenticated by the authentication server 120, the authentication server 120 will notify the client media device 24 that the user is denied access to the user-selected video stream.

Figure 3:
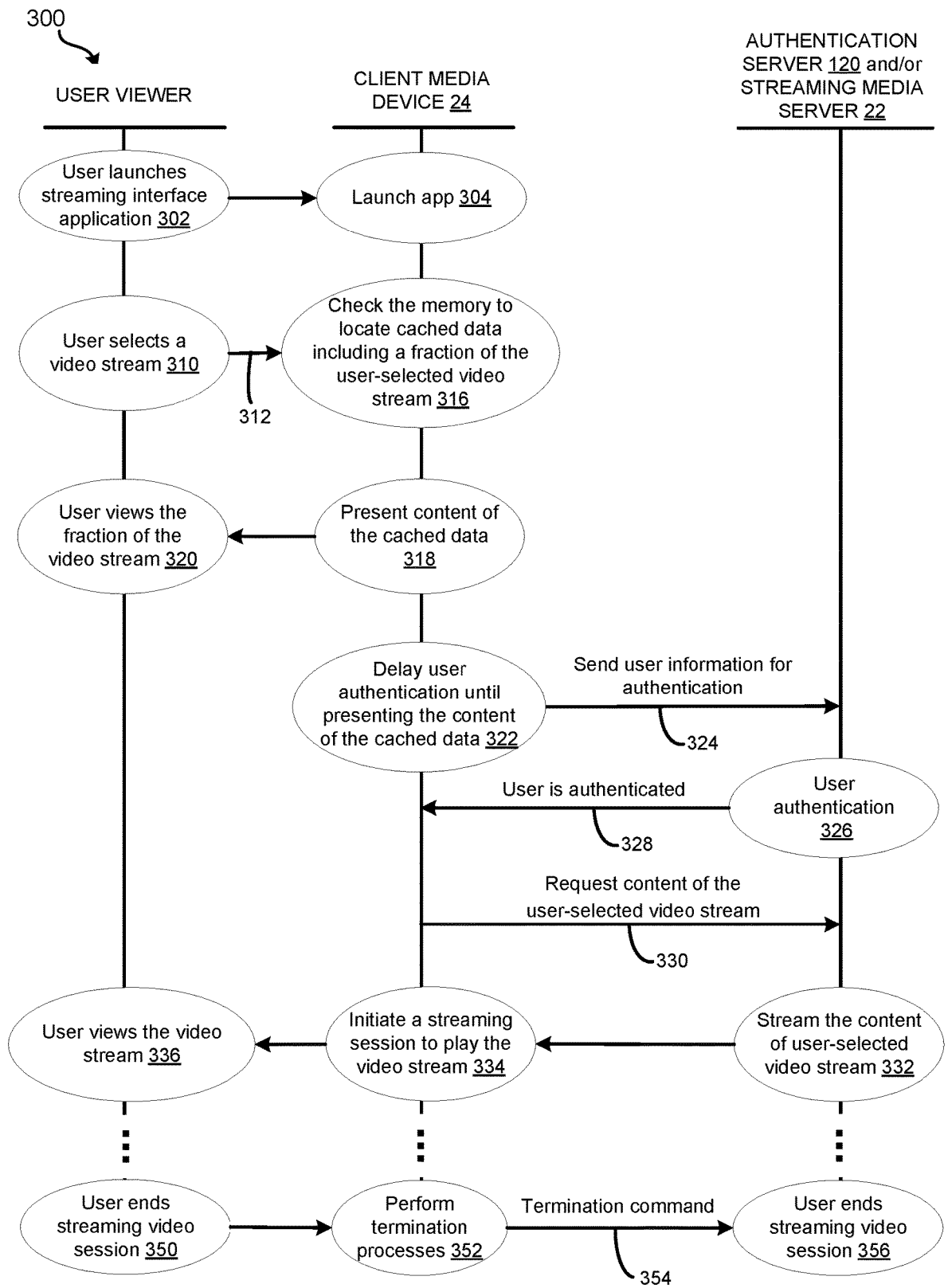
FIG. 3 is a message flow diagram illustrating another exemplary process for playing a video stream on a client media device illustrated in FIG. 1A and FIG. 1B in accordance with some embodiments.

FIG. 3 is a message flow diagram of another example process 300, as illustrated in accordance with some embodiments of the present disclosure. Process 300 is a variation of the process 200 and may contain the same or similar FUNCTIONS and TRANSMISSIONS included in the process 200. In the illustrated example, the process 300 commences in a similar manner with the process 200. For example, client media device 24 may initiate process 300 in response to the launch of a streaming media interface application 54 (FUNCTION 302). Streaming media interface application may be launched (FUNCTION 304) in response to a user input received at client media device 24. The user may immediately select a video stream (FUNCTION 310) and send a request for playing the full content of the user-selection video stream to the client media device 24 (TRANSMISSION 312).

Upon receipt of the user request of the full content of the user-selected video stream, the client media device is instructed to perform a memory check (FUNCTION 316) to determine the presence or absence of any cached data that includes a fraction of the content of the user-selected video stream. If such cached data is present in the memory, the client media device 24 is instructed to locate such cached data, retrieve and process such cached data to initiate a first video streaming session to present the content of the cached data (FUNCTION 318) on the client media device 24 for the user to view (FUNCTION 320). For example, the client media device 24 might have stored the identity of the last-viewed video stream in cache or memory when the last streaming session was terminated unfinished before the process 300 commences. Similar to the process 200, the client media device 24 is instructed to delay initiation of user authentication (FUNCTION 322) until after initiating playing the fraction of the content of the user-selected video stream included the cached data. Thus, the process 300 may allow the user to immediately resume the unfinished video stream before the user is authenticated. Accordingly, the user can quickly start viewing the video stream (FUNCTION 320) without the need to wait for user authentication to complete, and the user experience can be significantly improved.

After initiating the first video streaming session and concurrently with the playing the content of the cached data, the user authentication device 70 instructs the client media device 24 to perform a process for user authentication. Similar to the process 200, the client media device 24 may send user information (TRANSMISSION 324) along with a request for user authentication to the authentication server 120 and/or the streaming media server 22. Upon receipt of the user information, the authentication server 120 processes the user information and carries out the user authentication (FUNCTION 326) to grant or deny access to the user-selected video stream and/or determine the eligibility of the client media device for playing the user-selected video stream.

When the user is authenticated and the user access to the full content of the user-selected video stream is granted, the authentication server 120 sends a notification (TRANSMISSION 328) to the client media device 24. Upon receipt of the notification, the client media device 24 sends a request for the full content of the user-selected video stream (TRANSMISSION 330) to the streaming media server 22. In response, the streaming media server 22 establishes a connection with client media device 24 and initiates a second streaming session of the user-selected video stream (FUNCTION 332) to play the full content of the user-selected video stream to the client media device 24 (FUNCTION 334) and the user can view the full content of the user-selection video stream on the display device (FUNCTION 336). In some embodiments, the first streaming session seamlessly transitions to the second streaming session client without interruption of the steaming and the user could continuously view the content of the user-selected video stream without breaking the coherence of the media flow. In some embodiments, playing the fraction of content included in the cached data may last for a first duration of time, performing the user authentication may last for a second duration of time, and the second duration of time is no more than the first duration of time. In this way, the user authentication can be completed before the first streaming session is finished playing.

Similar to the process 200, when the user ultimately chooses to conclude the current streaming video session (FUNCTION 350), the client media device 24 may engage in the appropriate shutdown or termination process (FUNCTION 352). Client media device 24 then transmits a termination command to streaming media server 22 (TRANSMISSION 354), streaming media server 22 then terminates the current streaming session (FUNCTION 356), and process 300 concludes.

Figure 4:
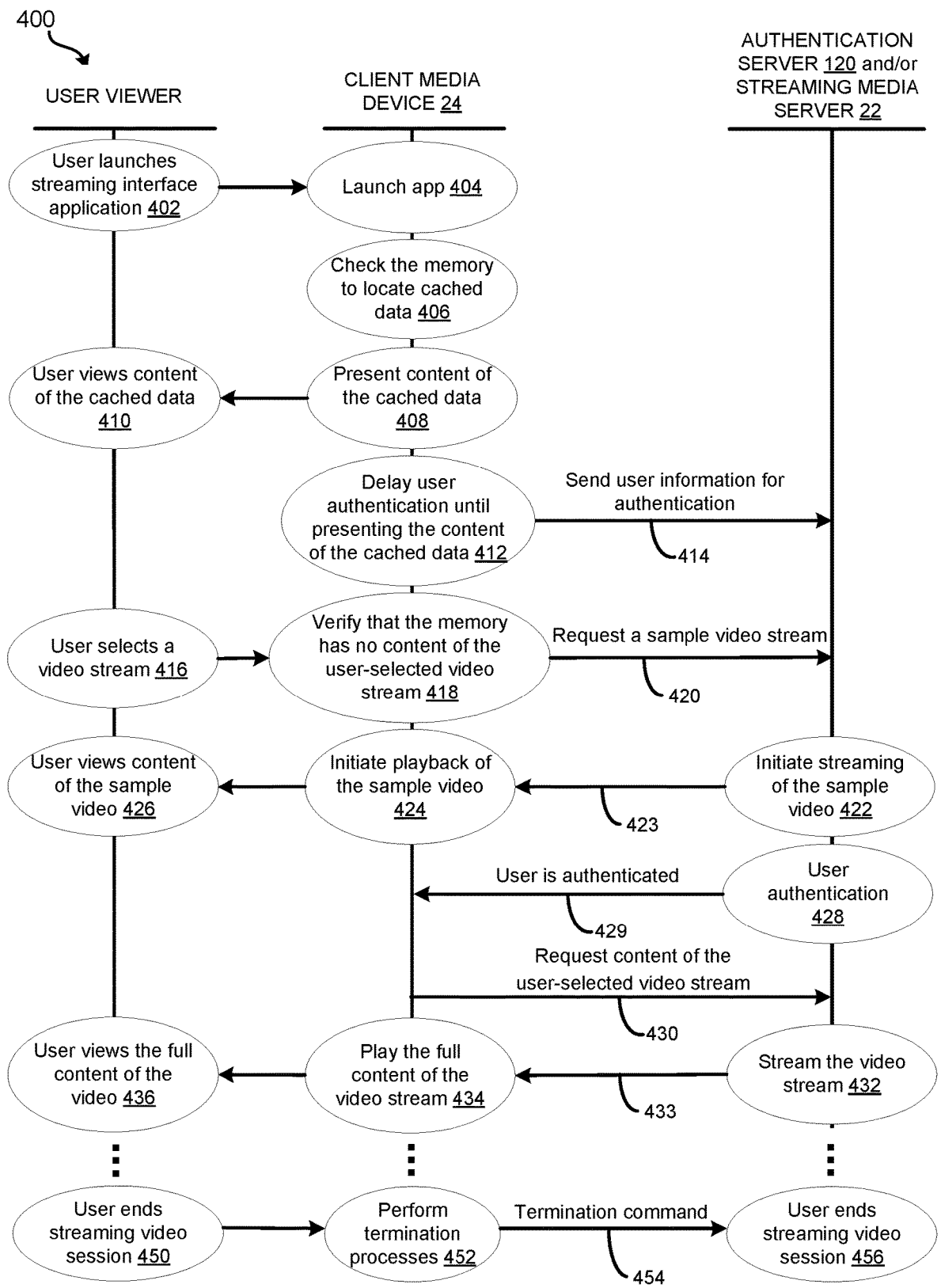
FIG. 4 is a message flow diagram illustrating yet another exemplary process for playing a video stream on a client media device illustrated in FIG. 1A and FIG. 1B in accordance with some embodiments.

FIG. 4 is a message flow diagram of yet another example process 400, as illustrated in accordance with some embodiments of the present disclosure. Process 400 is a variation of the processes 200 and 300 and may contain the same or similar FUNCTIONS and TRANSMISSIONS included in the processes 200 and 300. In the illustrated example, the client media device 24 may initiate process 400 in response to the launch of a streaming media interface application 54 (FUNCTION 402). Streaming media interface application may be launched (FUNCTION 404) in response to a user input received at client media device 24. Upon the launch of the streaming media interface application, the client media device 24 is instructed to perform a first memory check (FUNCTION 406) to determine the presence or absence of any cached data that includes content of the user's account associated with a content source. When the presence of the cached data is determined, the client media device 24 is instructed to locate cached data, retrieve and process the cached data to present the content included in the cached data on a display device in communication with the client media device (FUNCTION 408). The user then can view the contents included in the cached data (FUNCTION 410).

The client media device 24 is instructed to delay the initiation of user authentication (TRANSMISSION 412) until after initiating playing the content of the cached data. This allows the user to quickly start interacting with the streaming media interface application, viewing the content of the cached data presented on the client media device, browsing the home page of user accounts, previewing the video streams in advance, and selecting the video stream of interest. Because of the quick startup, the user need not wait for the user authentication process to complete, which may take a significant duration of time (e.g., from a few seconds to minutes). Accordingly, the user experience could be significantly improved. After initiating the playing of the content of the cached data and concurrently with the playing, the user authentication device 70 instructs the client media device 24 to perform user authentication. The client media device 24 may send a request for user authentication including user information to the authentication server 120 (TRANSMISSION 414).

In some embodiments, the user selects a video stream (FUNCTION 416) and requests the full content of the user-selected video stream when the process for user authentication is in progress (e.g., before the user is authenticated). At this time, no access to the full content of the user-selected video stream has been granted yet. In response to the user request, the client media device 24 may be instructed to perform a second memory check (FUNCTION 418) to determine the presence or absence of any cached data that includes a fraction of the content of the user-selected video stream. The second memory check may verify that no content of the user-selected video stream is available or accessible in the memory for the client media device 24 to play and present to the user. In response to the unavailable content of the user-selected video stream in the cached data, the client media device 24 is instructed to send a sample request (TRANSMISSION 420) for a sample of the user-selected video stream (hereinafter "sample video stream) to the streaming media server 22.

Upon receipt of the sample request for the sample video stream, the streaming media server 22 may initiate streaming of the sample video stream (FUNCTION 422) and establish a connection with the client media device 24 to transmit the content of the sample video stream (TRANSMISSION 423) to the client media device 24, when the user authentication process is in progress (e.g., before the user is authenticated). A pre-established agreement may exist between the streaming media server 22 and the content source to allow access to the sample video stream by the streaming media server 22 without prior user authentication. The client media device 24 initiates a first streaming session to play the sample video stream (FUNCTION 424) and the user could view content of the sample video stream (FUNCTION 426) before the user is authenticated. In this way, the user can quickly start viewing the content of the user-selected video stream without waiting for the user authentication to complete.

Similar to the process 300, when an outcome of the user authentication process indicates that the user is eventually authenticated (FUNCTION 428) and the user access to the full content of the user-selected video stream is granted, the authentication server 120 sends a notification (TRANSMISSION 429) to the client media device 24. Upon receipt of the notification, the client media device 24 sends a user request for the full content of the user-selected video stream (TRANSMISSION 430) to the streaming media server 22. In response, the streaming media server 22 establishes a connection with client media device 24 (TRANSMISSION 433) and initiates a second streaming session of the user-selected video stream (FUNCTION 434) to play the full content of the user-selected video stream to the client media device 24 and to allow the user to view the full content of the user-selection video stream (FUNCTION 436) on the display device. In some embodiments, the first streaming session seamlessly transitions to the second streaming session client without interruption of the steaming and the user could continuously view the content of the user-selected video stream without breaking the coherence of the media flow. In some embodiments, playing the sample video stream may last for a first duration of time, performing the user authentication may last for a second duration of time, and the second duration of time is no more than the first duration of time. In this way, the user authentication can be completed before the playing of the sample video stream is finished in the first streaming session.

In some embodiments, the sample video stream includes a relatively short portion of the user-selected video stream, such as a beginning portion or segment of the content of the user-selected video stream. Such beginning portion or segment may have a duration of a few minutes. The beginning portion or segment may be played in the first streaming session (FUNCTION 424) before the user authentication is initiated, and the user can start viewing the user-selected video stream from the beginning (FUNCTION 426) without waiting for the outcome of the user authentication or other obstructions. After the user is authenticated (FUNCTION 428) and the user's access to the full content of the user-selected video stream is granted, a remaining portion or segment of the content of the user-selected video stream (e.g., the beginning portion and the remaining portion are complementary) is streamed (FUNCTION 432) and transmitted to the client media device 24 (TRANSMISSION 433) and played in the second streaming session (FUNCTION 434). In some embodiments, the remaining portion (e.g., the complementary portion with respect to the beginning portion) of the user-selected video stream is played in second streaming session, after the beginning portion is played in the first streaming session in a seamless manner (e.g., without interruption in media flow or break in time), and the user can continuously view the user-selected video stream and enjoy a coherent and smooth flow of media content. In this way, the user experience and satisfaction can be significantly enhanced.

Similar to the process 300, when the user ultimately chooses to conclude the current streaming video session (FUNCTION 450), the client media device 24 may engage in the appropriate shutdown or termination process (FUNCTION 452). Client media device 24 then transmits a termination command to streaming media server 22 (TRANSMISSION 454), streaming media server 22 then terminates the current streaming session (FUNCTION 456), and process 400 concludes.

Figure 5:
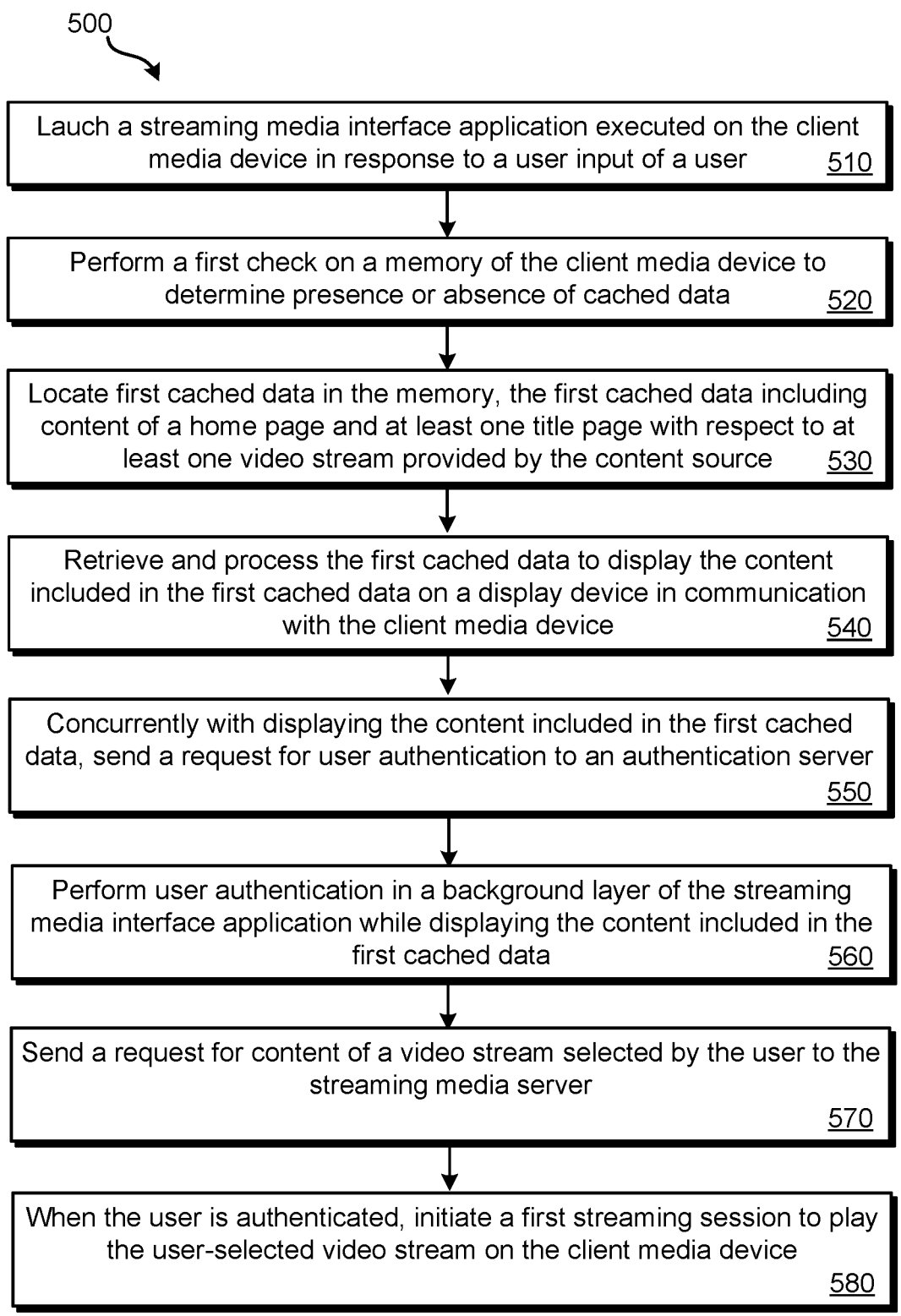
FIG. 5 is a flow diagram of an exemplary method for playing a video stream on a client media device in accordance with some embodiments.

FIG. 5 is a flow diagram illustrating an example method 500 for playing a video stream on a client media device in accordance with various embodiments. At 510, a streaming media interface application executed on a client media device is launched in response to a user input of a user. At 520, a first memory check on a memory of the client media device is performed by the client media device to determine presence or absence of any cached data. At 530, first cached data is located in the memory when the cached data is determined to be available and accessible in the memory. The first cached data includes content of a home page and at least one title page respectively corresponding to at least one video stream provided by a content source. At 540, the first cached data is retrieved and processed by the client media device to display the content included in the first cached data on a display device in communication with the client media device, and the user can view the content of the cached data, interact with the streaming media interface application, and select one or more video streams provided in the home page.

At 550, a user authentication process is initiated by sending user information along with a request for user authentication to an authentication server for the authentication server to process the user information, determine if the user is authorized/authenticated, and grant or deny access to the user-selected video stream by the client media device. The authentication server may be integrated into a streaming media server. In some embodiments, the authentication server may be a third-party server independent from the streaming media server. Initiation of the user authentication at 550 is delayed until after the initiation of displaying the content included in the first cached data at 540.

At 560, the user authentication process is performed in a background layer of the streaming media interface application while displaying the content included in the first cached data. In some embodiments, the user authentication process lasts for a first duration of time, displaying the content included in the first cached data lasts for a second duration of time, and the first duration of time is no more than the second duration of time.

At 570, a video stream is selected by the user and a user request for content of the user-selected video stream is sent to the streaming media server. At 580, the content of the user-selected video stream is received from the streaming media server when the user is authenticated. A first streaming session is initiated to play the user-selected video stream on the client media device upon receipt of the content of the user-selected video stream from the streaming media server.

In some embodiments, a video stream is selected by a user, and a user request for content of the user-selected video stream is sent to the streaming media server while the user authentication is still in progress (e.g., before the user is authenticated). A second memory check of the memory of the client media device is performed to determine the presence or absence of second cached data, the second cached data including a fraction of the content of the user-selected video stream. When the second cached data is determined to be available and accessible in the memory, the second cached data is retrieved from the memory and processed to initiate a second video streaming session prior to the initiation of the first video streaming session. The second video streaming session is initiated to play the fraction of the content of the user-selected video stream on the client media device concurrently with performing the user authentication process. In this way, the user can start viewing the content of the user-selected video stream without the need to wait until after the user is authenticated. When the user is authenticated by the authentication server, the first video streaming session is initiated seamlessly after the second video streaming session to allow the user to continuously view the content of the user-selected video stream without breaking the coherence of the media flow.

Figure 6:
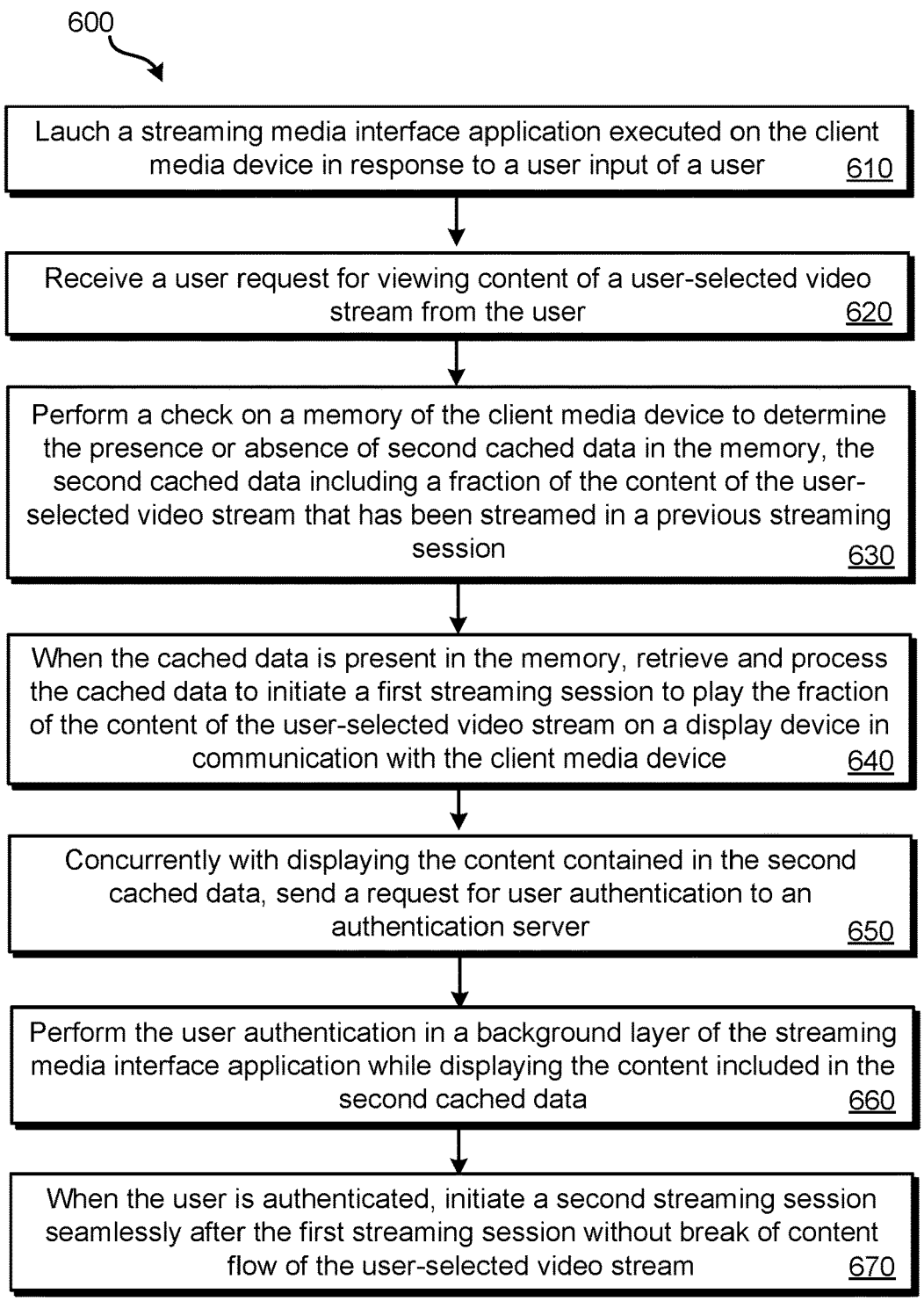
FIG. 6 is a flow diagram of another exemplary method for playing a video stream on a client media device in accordance with some embodiments.

FIG. 6 is a flow diagram illustrating an example method 600 for playing a video stream on a client media device in accordance with various embodiments. The method 600 or any operation/step thereof may be implemented in combination with any operation/step of the method 500. At 610, a streaming media interface application executed on a client media device is launched in response to a user input of a user. At 620, a video stream is selected by a user and a user request for viewing the content of the user-selected video stream is sent to a streaming media server. At 630, a memory check of the memory of the client media device is performed to determine the presence or absence of any cached data that includes a fraction of the content of the user-selected video stream. When the cached data is determined to be available and accessible in the memory, the cached data is retrieved from the memory and processed by the client media device to initiate a first video streaming session to play the fraction of the content of the user-selected video stream on the client media device. In this way, the user can start viewing the content of the user-selected video stream without the need to wait until after the user is authenticated.

At 650, a user authentication process is initiated by sending user information along with a request for user authentication to an authentication server for the authentication server to process the user information, determine if the user is authorized/authenticated, and grant or deny access to the user-selected video stream by the client media device. Initiation of the user authentication process at 650 is delayed until after the initiation of playing the content of the cached data (e.g., the fraction of the content of the user-selected video stream) at 640.

At 660, the user authentication process is performed in a background layer of the streaming media interface application while displaying the content included in the first cached data. In some embodiments, the user authentication process lasts for a first duration of time, playing the cached data lasts for a second duration of time, and the first duration of time is no more than the second duration of time.

When the user is authenticated, a second streaming session is initiated at 670, in response to the user request, to play the user-selected video stream on the client media device upon receipt of the content of the user-selected video stream from the streaming media server. The second streaming session is initiated seamlessly after the first streaming session to allow the user to continuously view the content of the user-selected video stream without breaking the coherence of the media flow.

Figure 7:
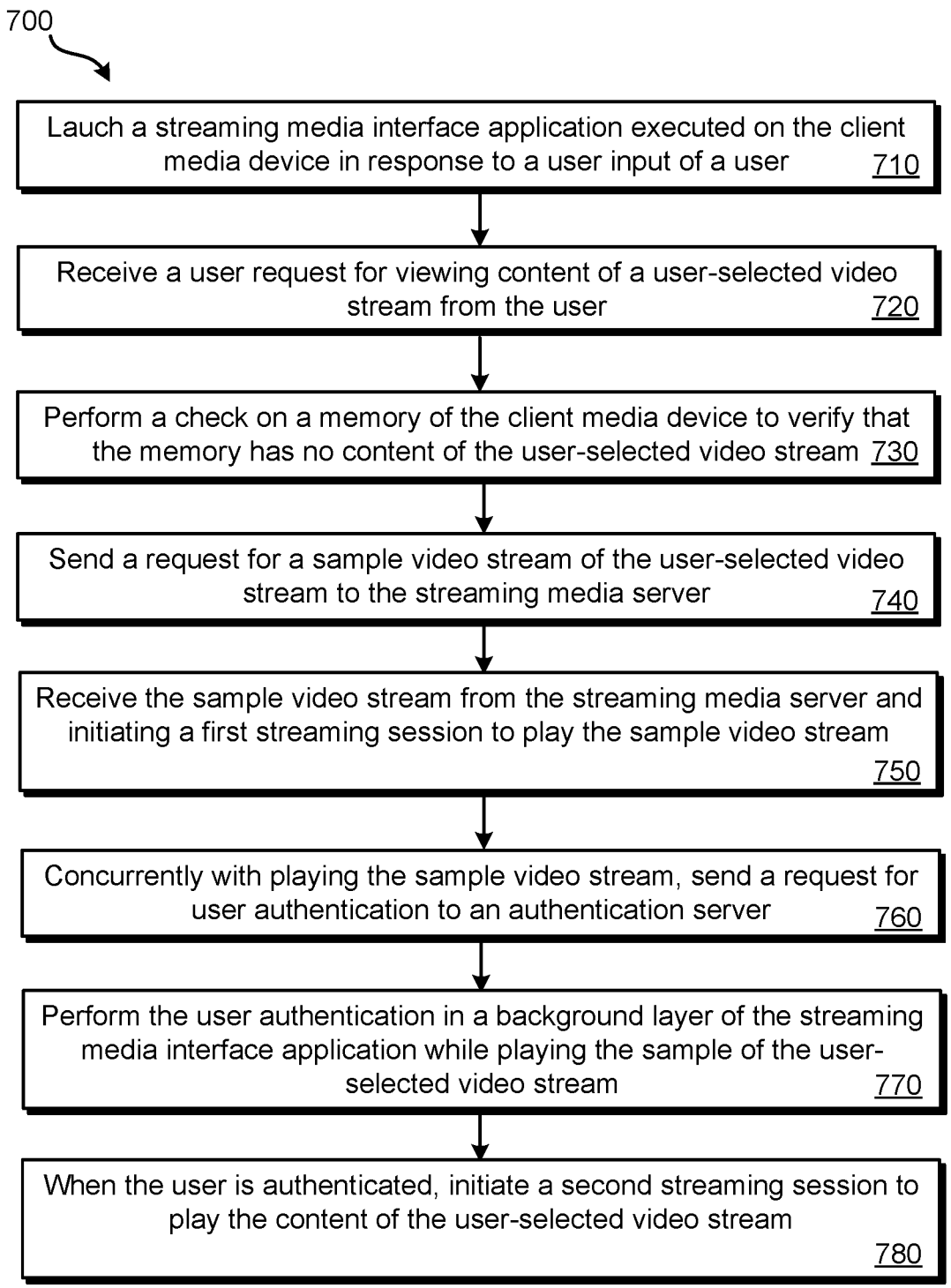
FIG. 7 is a flow diagram of yet another exemplary method for playing a video stream on a client media device in accordance with some embodiments.

FIG. 7 is a flow diagram illustrating an example method 700 for playing a video stream on a client media device in accordance with various embodiments. The method 700 or any operation/step thereof may be implemented in combination with any operation/step of the methods 500 and 600. At 710, a streaming media interface application executed on a client media device is launched in response to a user input of a user. At 720, a video stream is selected by a user and a user request for viewing the content of the user-selected video stream is sent to a streaming media server. At 730, a memory check of the memory of the client media device is performed. The memory check may locate cached data including content of a home page and at least one title page respectively corresponding to at least one video stream provided by a content source. The memory check may also verify that the memory has no available and accessible content of the user-selected video stream.

At 740, a sample video stream of the user-selected video stream is sent to the streaming media server. At 750, the sample video stream is received and processed by the client media device to initiate a first video streaming session to play the content of the sample video stream. In this way, the user can quickly start viewing the user-selected video stream before the process for user authentication is completed. As described above, the sample video may include a beginning portion/segment of the user-selected video stream.

In some embodiments, the cached data of the memory is retrieved and processed by the client media device to display the content included in the first cached data (e.g., the home page, title page, etc.) before or concurrently with playing the first video streaming session. The first video streaming session may be played in a PiP screen mode or a side-by-side screen mode.

At 760, a user authentication process is initiated and user information along with a request for user authentication is sent to an authentication server for the authentication server to process the user information, determine if the user is authorized/authenticated, and grant or deny access to the user-selected video stream by the client media device. Initiation of the user authentication process at 760 is delayed until after the initiation of the first video streaming session at 750.

At 770, the user authentication process is performed in a background layer of the streaming media interface application while playing the sample video stream and/or displaying the content included in the cached data. In some embodiments, the user authentication process lasts for a first duration of time, playing the sample video stream for a second duration of time, and the first duration of time is no more than the second duration of time.

When the user is authenticated, a second streaming session is initiated at 780 to play the content of the user-selected video stream on the client media device upon receipt of the content of the user-selected video stream from the streaming media server. The second streaming session is played after the first streaming session seamlessly (e.g., without interruption in media flow or break in time), and the user can continuously view the user-selected video stream and enjoy a coherent and smooth flow of media content.

The methods, program products, systems, and devices discussed above are examples. Various configurations may omit, substitute, or add various procedures or components as appropriate. For instance, in some embodiments, the methods may be performed in an order different from that described, and/or various stages may be added, omitted, and/or combined. Also, features described with respect to some configurations may be combined in various other configurations. Different embodiments of the configurations may be combined in a similar manner. Also, technology evolves and, thus, many of the elements are examples and do not limit the scope of the disclosure or claims.

Specific details are given in the description to provide a thorough understanding of example configurations (including embodiments). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the embodiments may provide an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a user" includes many such users, and reference to "the processor" includes reference to one or more processors and equivalents thereof, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

As used herein, "media content," "media program," "multimedia content," "audiovisual content," "video stream content," "video content," "content," or variants thereof should be understood as referring to any audiovisual programming or content in any streaming, file-based, or another format. The media content generally includes data that, when processed by a media player or decoder, allows the media player or decoder to present a visual and/or audio representation of the corresponding program content to a viewer (i.e., the user of a client media device including the media player or decoder). In one or more embodiments, a media player can be realized as a piece of software that plays multimedia content (e.g., displays video and plays audio).

Having described several example configurations, various modifications, alternative constructions, and equivalents may be used without departing from the spirit of the disclosure. For example, the above elements may be components of a larger system, and other rules may take precedence over or otherwise modify the application and teaching provided in the present disclosure. Also, a number of steps/operations may be undertaken before, during, or after the above elements are considered.

What is claimed is:

1. A computer-implemented method comprising:
   launching a streaming media interface application executed on the client media device in response to a user input of a user;
   performing a first check on a memory of the client media device to determine presence or absence of first cached data, the first cached data including content of a home page of a user's account associated with a content source and at least one title page with respect to at least one video stream provided by the content source;
   retrieving the first cached data from the memory and processing the first cached data to initiate displaying the content included in the first cached data on a display device in communication with the client media device;
   performing a process for user authentication, wherein performing the process for user authentication is delayed until after initiating displaying the content included in the first cached data;
   sending a user request for content of a video stream selected by the user to a streaming media server in communication with the content source;
   receiving the content of the user-selected video stream from the streaming media server in response to an outcome of the process for user authentication, the outcome indicating that the user is authenticated;
   initiating a first streaming session to play the content of the user-selected video stream on the client media device;
   in response to the user request for the content of the user-selected video stream, performing a second check on the memory of the client media device to determine the presence or absence of second cached data in the memory, the second cached data including a fraction of the content of the user-selected video stream from a last-played streaming session; and
   in response to determining that the second cached data is present in the memory, retrieving and processing the second cached data to initiate a second streaming session to play the fraction of the content of the user-selected video stream on the client media device.

2. The method according to claim 1, wherein performing the process for user authentication further comprises:
   sending an authentication request including user information to an authentication server in connection with the content source to allow the authentication server to authenticate the user; and
   performing the process in a background layer of the streaming media interface application while displaying the content included in the first cached data.

3. The method according to claim 1, wherein playing the second streaming session is concurrent with performing the process for user authentication, and the first streaming session is not initiated until the second streaming session is finished.

4. The method according to claim 1, further comprising:
   sending a sample request for a sample video stream of the user-selected video stream to the streaming media server;
   receiving the sample video stream from the streaming media server before the user is authenticated; and initiating a third streaming session to play the sample video stream on the client media device, wherein playing the third streaming session is concurrent with performing the process for user authentication, and the first streaming session is not initiated until the third streaming session is finished.

5. The method according to claim 4, further comprising: performing a second memory check to verify that the memory has no content of the user-selected video stream.

6. The method according to claim 4, wherein the sample video stream includes a beginning portion of the user-selected video stream.

7. The method according to claim 6, wherein the beginning portion of the user-selected video stream is played in the third streaming session, and a remaining portion of the user-selected video stream is played in the first streaming session seamlessly after the third streaming session.

8. The method according to claim 4, wherein playing the sample video stream is concurrent with displaying the content contained in the first cached data.

9. The method according to claim 8, wherein the sample video stream is played in a PiP screen mode or a side-by-side screen mode.

10. The method according to claim 1, further comprising notifying the user of a status of the user authentication, the status indicating whether the user is authenticated or not.

11. A client media device utilized in conjunction with a streaming media server and a communications network enabling communication between the client media device and the streaming media server, the client media device comprising:
  a processor; and
  a computer-readable storage media storing computer-executable code that, when executed by the processor, causes the client media device to:
    launch a streaming media interface application executed on the client media device in response to a user input of a user;
    perform a first check on a memory of the client media device to determine presence or absence of first cached data, the first cached data including content of a home page of a user's account associated with a content source and at least one title page with respect to at least one video stream provided by the content source;
    retrieve the first cached data from the memory and process the first cached data to initiate displaying the content included in the first cached data on a display device in communication with the client media device;
    perform a process for user authentication, wherein performing the process for user authentication is delayed until after initiating displaying the content included in the first cached data;
    send a user request for content of a video stream selected by the user to the streaming media server in communication with the content source;
    receive the content of the user-selected video stream from the streaming media server in response to an outcome of the process for user authentication, the outcome indicating that the user is authenticated;
    initiate a first streaming session to play the content of the user-selected video stream on the client media device;
    perform a second check on the memory of the client media device to determine the presence or absence of second cached data in the memory in response to the user request for the content of the user-selected video stream, the second cached data including a fraction of the content of the user-selected video stream from a last-played streaming session; and
    in response to a determination that the second cached data is present in the memory, retrieve and process the second cached data to initiate a second streaming session to play the fraction of the content of the user-selected video stream on the client media device.

12. The client media device according to claim 11, wherein, when executed by the processor, the computer-executable code further causes the client media device to:
  send an authentication request including user information to an authentication server in connection with the content source to allow the authentication server to authenticate the user; and
  perform the process for user authentication in a background layer of the streaming media interface application while displaying the content included in the first cached data.

13. The client media device according to claim 11, wherein, when executed by the processor, the computer-executable code further causes the client media device to:
  send a sample request for a sample video stream of the user-selected video stream to the streaming media server;
  receive the sample video stream from the streaming media server before the user is authenticated; and
  initiate a third streaming session to play the sample video stream on the client media device,
  wherein playing the third streaming session is concurrent with performing the process for user authentication, and the first streaming session is not initiated until the third streaming session is finished.

14. The client media device according to claim 13, wherein, when executed by the processor, the computer-executable code further causes the client media device to:
  perform a second memory check to verify that the memory has no content of the user-selected video stream.

15. The client media device according to claim 14, wherein the sample video stream includes a beginning portion of the user-selected video stream.

16. The client media device according to claim 15, wherein the beginning portion of the user-selected video stream is played in the third streaming session, and a remaining portion of the user-selected video stream is played in the first streaming session seamlessly after the third streaming session.

17. The client media device according to claim 16, wherein the sample video stream is played concurrently with displaying the content contained in the first cached data.

18. The client media device according to claim 17, wherein the sample video stream is played in a PiP screen mode or a side-by-side screen mode.

19. The client media device according to claim 11, wherein, when executed by the processor, the computer-executable code further causes the client media device to concurrently play the second streaming session and perform the process for user authentication, and the first streaming session is not initiated until the second streaming session is finished.

20. The client media device according to claim 11, wherein, when executed by the processor, the computer-executable code further causes the client media device to notify the user of a status of the user authentication, the status indicating whether the user is authenticated or not.

* * * * *